Jan. 13, 1942.  L. V. STOWE  2,270,148
LOW TIRE PRESSURE INDICATOR
Filed May 9, 1940  2 Sheets-Sheet 1
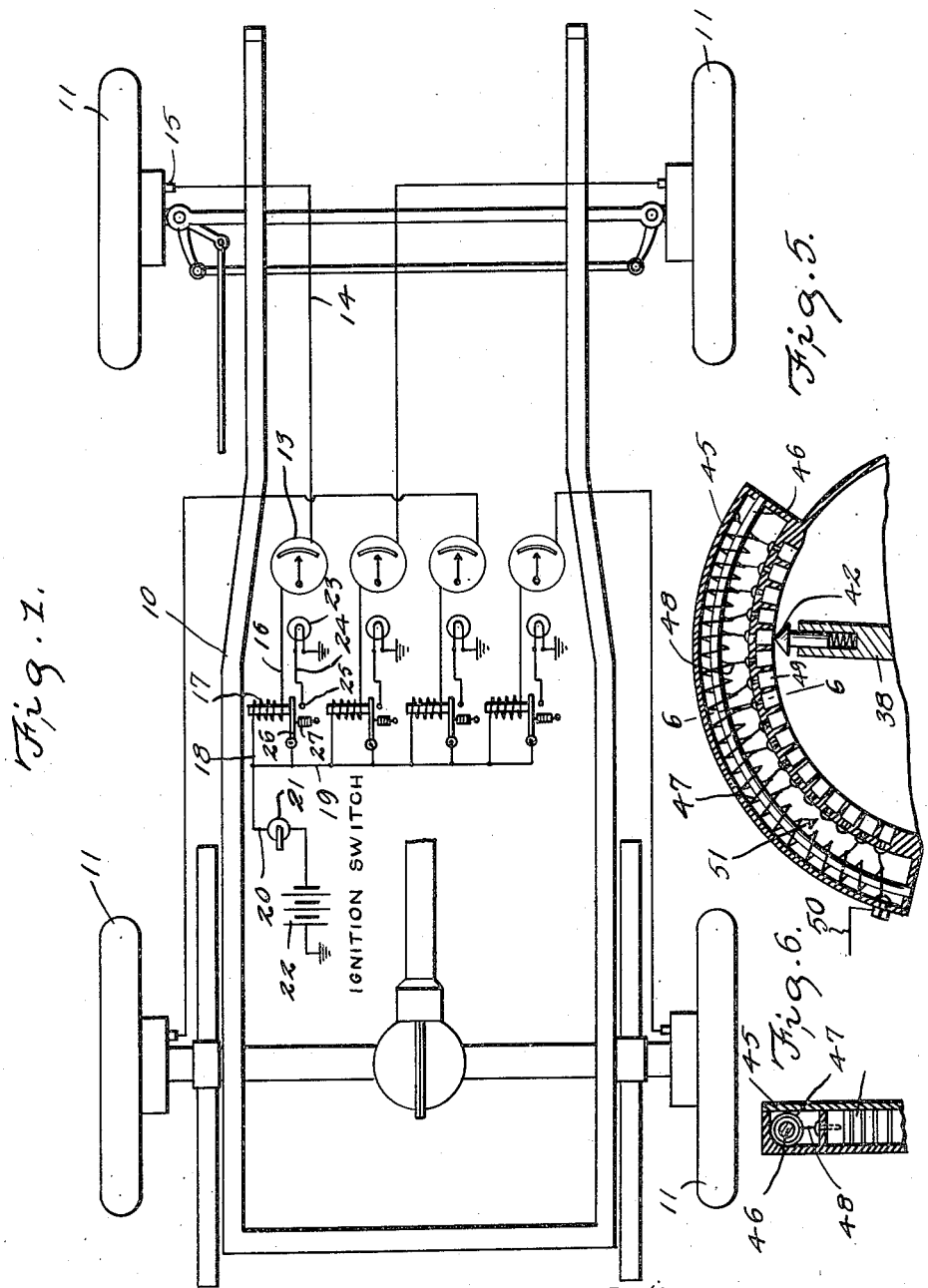
Lester V. Stowe INVENTOR
BY Victor J. Evans & Co.
ATTORNEYS Jan. 13, 1942. L. V. STOWE 2,270,148
LOW TIRE PRESSURE INDICATOR
Filed May 9, 1940 2 Sheets-Sheet 2
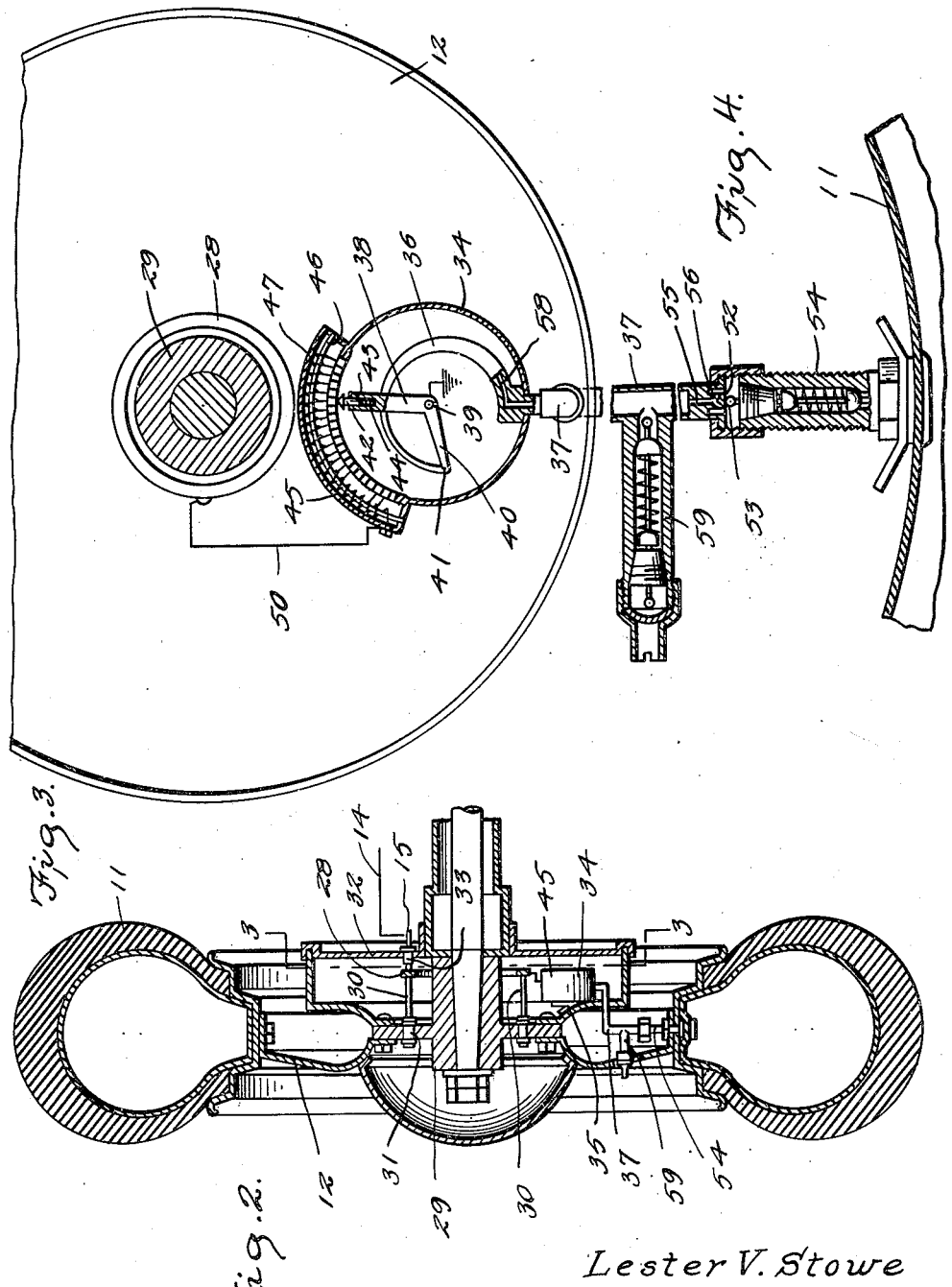
Lester V. Stowe
INVENTOR
BY Victor J. Evans & Co.
ATTORNEYS
WITNESS Patented Jan. 13, 1942

2,270,148

UNITED STATES PATENT OFFICE 2,270,148

LOW TIRE PRESSURE INDICATOR

Lester V. Stowe, Junction City, Calif., assignor of fifty per cent to Gilbert W. Sheehan, Daly City, Calif.

Application May 9, 1940, Serial No. 334,261

1 Claim. (Cl. 177—351)

This invention relates to a low tire pressure indicator, and has for an object to provide electric apparatus of this type including an ammeter, a signal lamp, a relay and a tire pressure responsive conductor arm movable along a resistance coil, for each tire on the vehicle, the resistance coil having a dead spot adapted to disconnect the current from the arm and relay and permit the spring controlled relay armature to establish a circuit to a signal lamp at a predetermined low pressure.

A further object is to provide tire pressure indicating apparatus of this character which will permit the driver to have visible indication on the ammeters of tire pressure conditions when the tires are adequately inflated, and when the pressure in any tire becomes dangerously low will warn the driver, by the signal lamp glowing, in ample time to permit him to pump up the low tire, and since the pressure responsive arm after traversing the dead spot on the resistance coil again passes on to a live section of the resistance coil and re-establishes the circuit through the respective ammeter and relay, will again permit the driver to have visible indication on the respective ammeter as pressure in the low tire decreases down to flat tire condition after the warning signal lamp has performed its work and becomes extinguished.

A further object is to provide electrical apparatus of the above described type which, in addition to indicating adequate and inadequate pressure conditions in the tires and giving a warning signal at a pre-determined pressure will also be adapted to be easily applied to used vehicles as well as vehicles in the course of manufacture and which will be in operation only when the ignition switch is closed, thus economizing in current consumption.

A further object is to provide apparatus of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a diagrammatic plan view of an electrical tire pressure indicator constructed in accordance with the invention, showing the electrical connections of the respective ammeters, relays and signal lamps.

Figure 2 is a cross sectional view of one of the wheels equipped with a tire pressure responsive conductor arm and resistance coil having a dead spot in accordance with the invention.

Figure 3 is a longitudinal sectional view taken on the line 3—3 of Figure 2.

Figure 4 is a longitudinal sectional view of the inflating valve mechanism.

Figure 5 is a detail longitudinal sectional view drawn to large scale, showing the resistance coil having a dead spot and showing the pressure responsive conductor arm.

Figure 6 is a detail cross sectional view taken on the line 6—6 of Figure 5.

Referring now to the drawings in which like characters of reference designate similar parts in the various views, 10 designates a chassis, 11 the tire and 12 the wheels of a motor vehicle. In carrying out the invention four ammeters 13, one for each tire, are preferably mounted on the instrument board in convenient view of the driver and are connected by a conductor wire 14 to the terminal 15 of tire pressure controlled means carried by a respective wheel 12 as will be hereinafter more fully explained. Each ammeter is also connected by a wire 16 to one end of the coil of a relay 17, the other end of the coil being connected by a wire 18 to a common lead wire 19 for all of the relay coils which common wire is connected by a conductor wire 20 to the ignition switch 21 so that when the latter is closed, current will flow from the battery 22 through all of the coils of the relay 17, ammeters 13 and wire 14 to the pressure responsive mechanisms on the four wheels.

Associated with each ammeter is a respective signal lamp 23 which is connected by a conductor wire 24 to a back contact 25 of the respective relay armature 26. A spring 27 is connected to the armature and tends constantly to hold the armature in circuit closing position in engagement with the contact 25. When current supplied through any relay coil is terminated caused by an open circuit condition of the respective tire pressure responsive means, the relay coil will be de-energized and will permit the spring 27 to close the circuit through the signal lamp, and thus warn the driver of a pre-determined low tire pressure condition in a respective tire. The tire pressure responsive means carried by each wheel, as best shown in Figures 2, 3 and 4, comprises a conductor ring 28 which is disposed concentric with the hub 29 of the wheel 12 and is connected to the wheel by bolts 30 which are engaged through insulating bushings 31 on the wheel. The conductor ring rotates with the wheel. The above-mentioned terminal 15 is engaged through the stationary back plate 32 of the wheel and is insulated from the wheel by an insulating bushing 33. The terminal has wiping engagement with the conductor ring 28 as the wheel rotates. A cylindrical casing 34 formed of insulating material is secured to a wheel by a bracket 35, best shown in Figure 2. A pressure gauge tube 36 projects at one end from the casing and is connected to a pipe 37 which is connected to the inner tube of a respective tire as will be presently described so that it carries tire pressure to deform the pressure gauge tube responsive to variations in tire pressure.

A pressure responsive arm 38 is pivotally mounted at the lower end as shown at 39 on the disk wall of the cylindrical casing and is provided with a crank arm 40 which is connected to the free end of the pressure gauge tube 36 by a pin 41, or other connector. The pressure responsive arm is provided with a contact point 42 which enters a bore 43 formed in the end of the arm and is spring pressed outwardly by a helical spring 44 seated in the bore behind the contact point. The pressure gauge tube 36 tends to flatten out as tire pressure increases and move the arm 38 in a clockwise direction, and when tire pressure decreases, the pressure gauge tube tends to curl up and move the arm in a counter-clockwise direction.

An arcuate housing 45, formed of insulating material, is secured to the casing 34 adjacent to the hub of the wheel and coiled upon an arcuate insulating core 46, in the housing is a resistance coil 47, best shown in Figure 6. The resistance coil is provided at pre-determined intervals with taps 48 which are connected to respective commutator blocks 49 which are arranged in an arcuate series on the inner periphery of the housing and are exposed for contact with the point 42 of the conductor arm 38. A conductor wire 50 is connected to the conductor ring 28 and is connected to the initial end of the resistance coil 47. A dead space 51 is formed on the coil by omitting a plurality of taps from successive windings so that when the conductor arm, which is grounded, traverses the commutator blocks of this dead space, no current will flow through the coil and consequently since the coil is connected by the conductor ring 28 and terminal 15 to a respective relay coil 17 and respective ammeter 13, no current will flow through these instruments.

The dead space is located near the initial end of the resistance coil so that under adequate tire pressure conditions the pointer will be disposed near the final end of the resistance coil so that maximum resistance will be in the ammeter and relay coil circuit. As tire pressure decreases the conductor arm will move correspondingly in a clockwise direction decreasing the resistance in the coil and the ammeter and showing a corresponding reading. At a predetermined low tire pressure the conductor arm 38 will ride onto the commutator blocks of the dead space in the coil, and in this open circuit position of the arm, no current will flow to the ammeter and respective relay coil so that the armature of the respective relay coil will be moved by its spring 27 to closed circuit position against contact 25 of the corresponding signal lamp 23 and cause current to flow from the battery to this lamp for energizing the lamp to warn the driver of a dangerous low pressure tire condition. When tire pressure falls still lower, assuming that the pressure has not been restored by pumping up the tire, the conductor arm 38 will ride onto the commutator blocks near the initial end of the resistance coil and in this circuit closing position again permit current to flow from the battery to the corresponding relay coil and corresponding armature which latter will then show a corresponding low reading until finally the flat tire pressure condition exists.

For connecting the pressure gauge tube 36 to the tire 11, the pipe 37 heretofore mentioned is provided with an axial lug 52 which engages against the stem 53 of the conventional tire valve mechanism 54 and holds the valve mechanism open so that tire pressure may equalize from the tire into the tube through a central duct 55 in the tube which terminates in a branch duct 56 which latter opens out through the lug 52. The tire pressure in the pipe 57 equalizes into the pressure gauge tube 36 through the conventional duct 58 in the gauge tube.

An inflating valve mechanism 59 is connected to the tube 37 and this valve mechanism may be of the conventional type.

Since the operation of the apparatus has been described as the description of the parts progressed, it is thought that the invention will be fully understood without further explanation.

What is claimed is:

A tire pressure indicator comprising, the combination with a wheel having a pneumatic tire, of an ammeter, a relay, an arcuate resistance coil connected to and insulated from the wheel, an arcuate series of commutator bars secured to and insulated from the wheel, taps connected at intervals to the coil and connected to respective commutator bars, a selected commutator bar of the series being disconnected from the coil, a pivoted tire pressure responsive arm having wiping engagement with the commutator bars arranged so that contact of the arm with the commutator bar having no tap effectively electrically disconnects the arm and resistance coil at the disconnected commutator bar so that no current will flow from the coil through the arm, the ammeter, a relay, and the resistance coil being connected in series circuit, a signal lamp, and a circuit for the lamp controlled by the relay, the arrangement being such that when the relay coil is energized the lamp circuit is broken, the pressure responsive arm coacting with the resistance coil on both sides of the dead space in the coil to produce readings on the ammeter corresponding to variations in tire pressure, said arm coacting with the dead space through the disconnected commutator bar through a predetermined time period to open the circuit of the ammeter and relay coil and permit the relay to close the lamp circuit.

LESTER V. STOWE.